US008553287B2

(12) United States Patent
Yasutomi et al.

(10) Patent No.: US 8,553,287 B2
(45) Date of Patent: Oct. 8, 2013

(54) PSEUDO-HALFTONING DEVICE, IMAGE FORMING APPARATUS, AND IMAGE FORMING SYSTEM

(75) Inventors: Kei Yasutomi, Tokyo (JP); Kazuki Funahashi, Tokyo (JP); Takuroh Sone, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 252 days.

(21) Appl. No.: 12/929,991

(22) Filed: Mar. 1, 2011

(65) Prior Publication Data
US 2011/0222125 A1 Sep. 15, 2011

(30) Foreign Application Priority Data

Mar. 9, 2010 (JP) .................. 2010-051415

(51) Int. Cl.
*H04N 1/405* (2006.01)
(52) U.S. Cl.
USPC ......... 358/3.21; 358/3.26; 358/3.06; 358/461
(58) Field of Classification Search
USPC ................ 358/1.9, 2.1, 3.06–3.09, 3.26, 461, 358/521, 3.21, 3.1, 3.14, 1.7, 448
See application file for complete search history.

(56) References Cited

U.S. PATENT DOCUMENTS

| 4,841,377 | A | * | 6/1989 | Hiratsuka et al. | ............ 358/3.08 |
| 5,822,086 | A | * | 10/1998 | Kuznetsov | .................... 358/3.15 |
| 6,674,546 | B1 | * | 1/2004 | Nakahara | ....................... 358/1.9 |
| 7,403,735 | B2 | | 7/2008 | Yasutomi et al. | |
| 7,643,179 | B2 | | 1/2010 | Yasutomi | |
| 7,724,394 | B2 | | 5/2010 | Yasutomi et al. | |
| 7,746,502 | B2 | | 6/2010 | Yasutomi et al. | |
| 2006/0066910 | A1 | | 3/2006 | Yasutomi | |
| 2006/0279589 | A1 | | 12/2006 | Yasutomi et al. | |

FOREIGN PATENT DOCUMENTS

| JP | 02266761 | A | * | 10/1990 |
| JP | 07336550 | A | * | 12/1995 |
| JP | 2000299783 | A | | 10/2000 |
| JP | 2001061064 | A | | 3/2001 |
| JP | 2006049992 | A | | 2/2006 |
| JP | 3823703 | | | 7/2006 |

OTHER PUBLICATIONS

Image Processing for Halftone Reproduction, Naeto Kawamura, 1985 Electrophotography—The Society Journal, vol. 24 No. 1, pp. 51-59.
English language abstract of JP 2002-077646.

* cited by examiner

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

An image forming system includes a pseudo-halftoning device; an image forming apparatus that forms a toner image on a recording medium; and a reading apparatus that read the toner image on the recording medium, in which the pseudo-halftoning device is such that pseudo-halftoning is performed on a target image by using a threshold matrix set including a plurality of threshold matrices, one threshold matrix for use is selected from the threshold matrix set according to a position of the target image to be used in the pseudo-halftoning performed on the target image, the threshold matrices in the threshold matrix set are identical with one another in periodic structure but different from one another only in a gradation characteristic, and a threshold matrix to be used is determined based on toner-image information data obtained by reading the toner image by the reading apparatus.

16 Claims, 7 Drawing Sheets

| A1 | A6 | A11 | A16 | A21 |
| A2 | A7 | A12 | A17 | A22 |
| A3 | A8 | A13 | A18 | A23 |
| A4 | A9 | A14 | A19 | A24 |
| A5 | A10 | A15 | A20 | A25 |

| A1 | A6 | A11 | A16 | A21 |
| A2 | A7 | A12 | A17 | A22 |
| A3 | A8 | A13 | A18 | A23 |
| A4 | A9 | A14 | A19 | A24 |
| A5 | A10 | A15 | A20 | A25 |

FIRST RECORDING SHEET  SECOND              THIRD
(INDICATED BY           RECORDING SHEET    RECORDING SHEET
THICK LINES)

FIRST RECORDING SHEET  SECOND              THIRD
(INDICATED BY           RECORDING SHEET    RECORDING SHEET
THICK LINES)

PSEUDO-HALFTONING DEVICE, IMAGE FORMING APPARATUS, AND IMAGE FORMING SYSTEM

CROSS-REFERENCE TO RELATED APPLICATIONS

The present application claims priority to and incorporates by reference the entire contents of Japanese Patent Application No. 2010-051415 filed in Japan on Mar. 9, 2010.

BACKGROUND OF THE INVENTION

1. Field of the Invention

The present invention relates to an image forming system configuring a copying machine, a facsimile machine, a printing machine, a multifunction peripheral thereof, or the like, and more particularly, to a pseudo-halftoning device that performs dithering, which is one form of pseudo-halftoning, in an image forming system, and an image forming apparatus and an image forming system that include the pseudo-halftoning device.

2. Description of the Related Art

Image data to be input to an image forming apparatus as data for a tone image, such as a photograph, is generally multilevel data having 8 to 12 bits per pixel. As compared to this, the number of gray levels per pixel that can be expressed by image forming apparatuses (including electrophotography) for forming an image (so called a hardcopy) on paper is substantially considerably small. To accommodate such a problem, a hardcopy producing equipment increases resolution to 600 dots per inch (dpi), 1200 dpi, or the like and performs area coverage modulation to change image density with a plurality of pixels, thereby displaying a halftone image in a pseudo manner. Pseudo-halftoning is image processing to be performed in a process of converting input image data into a pseudo-halftone image.

Quantization of multilevel image data by dithering is described in detail in known patent documents and non-patent documents (particularly, see, Electrophotography, Vol. 24, No. 1, pages 51-59 (1985)). Hence, a pseudo-halftoning device employing dithering is briefly described below.

It is assumed that the pseudo-halftoning device employing dithering generates, from image data (having 8-bit (256 gray levels) data per color per pixel, for instance) before being subjected to pseudo-halftoning, image data (having 4-bit (16 gray levels) data per color per pixel, for instance) subjected to pseudo-halftoning by referring to a table called a dither matrix or a threshold matrix. A dither matrix for use in generating 4-bit data from 8-bit data as in this example includes 15 planes (the number of planes is smaller by one than 16, which is the number of gray levels after pseudo-halftoning). In each plane, one of 255 threshold values (the number of threshold values is smaller by one than 256, which is the number of gray levels before pseudo-halftoning) from 0 to 254 is assigned to each pixel.

A pseudo-halftoning method by dithering determines a value of each pixel in the image data after pseudo-halftoning in accordance with a comparative relationship between a value of pixel data of the image data before pseudo-halftoning and a threshold value assigned to each pixel in each plane of the dither matrix discussed above. Various types of dithering can be implemented by changing a way for assigning threshold values to each plane and a threshold value to each pixel in the dither matrix.

For instance, different types of halftoning, such as dot screen and line screen used for describing shapes of halftone dots, can be implemented by appropriately assigning threshold values to the dither matrix. Similarly, different sizes of periodic structure, such as screen ruling, and different types of halftoning, such as nonperiodic type, e.g., blue noise and green noise, can be implemented by appropriately assigning threshold values to the dither matrix.

An image forming apparatus typically includes, in addition to such a pseudo-halftoning device as discussed above, a tone correction device. A major function of the tone correction device is to perform tone correction on an input image while taking output characteristics of the image forming apparatus into consideration so that the input image is output with intended gradation characteristics. The tone correction is typically performed by converting input image data into output image data having the same number of gray levels (generally, the number of gray levels of an input image is 8 bits; accordingly, the tone correction is typically conversion from 8 bits into 8 bits). Such a tone correction places a limit that a tone-corrected image can be reproduced only at the number of levels equal to or fewer than 8 bits. This can cause so called gray-level missing to occur. This gray-level missing can produce a segment where a large tone jump occurs, or the like, which is a factor of degrading image quality.

As one of measures for preventing or reducing the gray-level missing, methods of incorporating tone conversion in a dither matrix have been proposed. A technique corresponding to such a method is disclosed in, for instance, Japanese Patent Application Laid-open No. 2001-61064.

The reason why incorporating tone conversion in a dither matrix can reduce gray-level missing is described below. A dither matrix has a degree of freedom in the number of gray levels equal to the number of positions, to each of which a threshold value can be assigned. The number of positions, to each of which a threshold value can be assigned, is equal to a product of the number of planes in the dither matrix and the number of pixels in each plane. It is relatively easy to set the number of pixels in each plane to a large value by using a super matrix (a dither matrix subsuming a plurality of basic dither periods). Accordingly, by using a dither matrix having a large number of pixels, a dither matrix having a degree of freedom in the number of gray levels greater than the number of gray levels of an input image can be generated easily and used.

A dither matrix incorporating tone conversion can be obtained by arranging 255 threshold values from 0 to 254 in a dither matrix having a large degree of freedom in the number of gray levels in such a density distribution as to acquire intended gradation characteristics. For instance, a dither method that incorporates intended tone conversion can be implemented by setting, for an area where a change in the gray levels in an output image needs to be small, the number of threshold values assigned to the area relatively small, whereas setting, for an area where a change in the gray levels in an output image needs to be large, the number of threshold values assigned to the area relatively large.

The method of incorporating tone conversion in a dither matrix as discussed above is equivalent to extraction of necessary gray levels (256 gray levels) from gray levels that can be realized by using a threshold matrix having a large degree of freedom in the number of gray levels. Put another way, the method is equivalent to tone conversion with a relatively large number of gray levels; hence, gray-level missing can be reduced.

Meanwhile, Japanese Patent Application Laid-open No. 2001-61064 discloses an image processing apparatus which performs multilevel dithering by using a reference threshold array and in which gamma conversion for converting image data into image data having target output characteristics is incorporated in threshold values of each dither threshold plane used in the multilevel dithering. It is discussed in Japanese Patent Application Laid-open No. 2001-61064 that with conventional dither method, interference between different colors produces a moire pattern, such as a rosette pattern, or visually noticeable unintended texture at a specific gray level; hence, there are many problems to be solved to obtain optimum output characteristics across all gray levels. It is discussed that the image processing apparatus configured as discussed above serves as a solution to the conventional problems and can improve tone reproduction.

In Japanese Patent Application Laid-open No. 2006-49992, an image forming apparatus including an edge detection unit that detects edges in an input image by forming an image matrix and by using an edge-detection filter and a solid-image-portion detection unit that detects a solid-image portion by calculating a range of variation in neighboring pixel data and comparing the range of variation with a preset threshold value. The image forming apparatus selectively performs pseudo-halftoning appropriate for a target image portion based on a result of edge detection performed by the edge detection unit and a result of solid-image portion detection performed by the solid-image-portion detection unit. It is discussed in Japanese Patent Application Laid-open No. 2006-49992 that although a conventional technique enables processing to be performed selectively between a character portion and a non-character portion, the technique has been disadvantageous in not allowing different processing to be performed for a solid-image portion that can be detected. In contrast, it is described that the image processing apparatus configured as discussed above is capable of pseudo-halftoning in a manner optimum in both sharpness of characters and smoothness of solid-image portions for each image portion.

Japanese Patent No. 3823703 discloses an image processing apparatus including a sampling unit that performs sampling on each of color components of input multilevel image data corresponding to a threshold matrix not having a screen angle, an interpolating unit that generates image data sampled corresponding to a threshold matrix having a screen angle from image data of color components other than one color component among sampled image data, and a pseudo-halftoning unit that performs area coverage modulation on the image data of the one color component sampled by the sampling unit by using a threshold matrix not having a screen angle and performs area coverage modulation on the image data of the other color components generated by the interpolating unit by using a threshold matrix having a screen angle.

It is discussed in Japanese Patent No. 3823703 that an image processing apparatus having a conventional configuration has been disadvantageous in that, to perform halftoning by using a multiple types of threshold matrices that differ from one another in screen angle, it has been necessary for the image processing apparatus to include, individually for each of the screen angles, units for removing high-frequency components, which results in an increase in size and cost of the image processing apparatus that performs area coverage modulation. In contrast, the image processing apparatus configured as discussed above is capable of area coverage modulation by using threshold matrices having screen angles without storing image data about two-dimensional positions corresponding to the threshold matrices having screen angles in advance, so that it becomes easy to realize size reduction, cost reduction, and the like of the apparatus as well as speedup in processing, and furthermore versatility of area coverage modulation can be sufficiently ensured by facilitating a process for changing a screen angle.

An image forming apparatus is required to output an image in the same colors (in the same lightness or in the same density when the image is a monochrome image) as those of input image data. Accordingly, an image forming apparatus is designed to maintain colors of output images constant. However, to be more exact, colors of output images for a single input image data are not completely identical with each other depending on an image forming position, and the like, and are reproduced in different colors. Such a phenomenon, in which in spite of the fact that images are desirably reproduced in the same colors, the images are undesirably reproduced in different colors for some reason, is referred to as color fluctuation below.

The color fluctuation can be roughly classified into two types.

A first type is color fluctuation with certain regularity. This type of color fluctuation with regularity can be caused by various causes. For instance, variation in light intensity that depends on a position in the main-scanning direction in optical writing performed in laser raster scan (exposure method typically used in an electrophotographic image forming apparatus) causes the first type of color fluctuation. Other examples of the cause for the color fluctuation with regularity include variation in thickness of a photosensitive layer on a photosensitive drum and a decentering of the photosensitive drum (decentering of the drum causes development gap or the like to change regularly). Attempts for reducing this type of color fluctuation with regularity have already been made because it is relatively easy to determine a cause therefor and to take a countermeasure. However, taking a sufficient countermeasure against the color fluctuation leads to addition of a mechanism, which results in an increase in cost. Furthermore, in recent years, further reduction in color fluctuation has been desired because requests for output images in invariant colors have increased than in the past. Thus, a technique that allows reduction in color fluctuation less expensively is eagerly desired.

The other type of the color fluctuation is color fluctuation without regularity. This type of color fluctuation without regularity is caused by various causes as well; however, it is difficult in many cases to determine a cause therefor because of the irregularity. Examples of this type of color fluctuation include color fluctuation caused by environmental changes, such as ambient temperatures and humidity, and color fluctuation caused by usage patterns in the past (caused by a change in characteristics of a part over long term use or the like).

Disclosed in Japanese Patent Application Laid-open No. 2001-61064 is the technique of performing gamma conversion (corresponding to tone conversion in the present invention) by incorporating it in threshold values in each of dither threshold planes for use in multilevel dithering. However, this technique aims to obtain optimum output characteristics across all gray levels rather than solving the color fluctuation problem. Hence, although gamma conversion is incorporated in the dither threshold planes, the threshold planes incorporating the gamma conversion are applied to every image segment, so that this technique fails to solve a problem, resulting from the color fluctuation, that gradation characteristics vary on a per-image-segment (per-image-position) basis.

Disclosed in Japanese Patent Application Laid-open No. 2006-49992 is the technique of applying different dither matrices on an image-segment-by-image-segment basis. However, this technique aims to attain both sharpness of characters and smoothness of solid-image portions. In other words, only two types of dither matrices for character image portions and solid-image portions are provided; therefore, a technique of applying different dither matrices individually to each of three or more types of image segments is not described. Hence, this technique, fails to solve the problem, resulting from the color fluctuation, that gradation characteristics vary on a per-image-segment (per-image-position) basis.

Disclosed in Japanese Patent No. 3823703 is the technique of including the interpolating unit that interpolates image data. However, a technique for solving the problem, resulting from the color fluctuation, that gradation characteristics vary on a per-image-segment (per-image-position) basis is not referred to in Japanese Patent No. 3823703. Hence, the technique disclosed in Japanese Patent No. 3823703 fails to solve the problem, resulting from the color fluctuation, that gradation characteristics vary on a per-image-segment (per-image-position) basis.

SUMMARY OF THE INVENTION

It is an object of the present invention to at least partially solve the problems in the conventional technology.

According to an aspect of the present invention, there is provided an image forming system including a pseudo-halftoning device; an image forming apparatus that forms a toner image on a recording medium; and a reading apparatus that read the toner image on the recording medium, in which the pseudo-halftoning device is such that pseudo-halftoning is performed on a target image by using a threshold matrix set including a plurality of threshold matrices, one threshold matrix for use is selected from the threshold matrix set according to a position of the target image to be used in the pseudo-halftoning performed on the target image, the threshold matrices in the threshold matrix set are identical with one another in periodic structure but different from one another only in a gradation characteristic, and a threshold matrix to be used is determined based on toner-image information data obtained by reading the toner image by the reading apparatus.

According to another aspect of the present invention, there is provided an image forming system including a pseudo-halftoning device; an image forming apparatus that forms a toner image on a recording medium; and a reading apparatus that reads the toner image on the recording medium, in which the pseudo-halftoning device is such that pseudo-halftoning is performed on a target image by using a threshold matrix set including a plurality of threshold matrices, one threshold matrix for use is selected from the threshold matrix set according to a position of the target image to be used in the pseudo-halftoning performed on the target image, the threshold matrices in the threshold matrix set are generated from a same parent matrix having a higher degree of freedom in number of gray levels, and a gradation characteristic of a threshold matrix generated from the parent matrix is generated based on toner-image information data obtained by reading the toner image by the reading apparatus.

According to still another aspect of the present invention, there is provided an image forming system including a pseudo-halftoning device; an image forming apparatus that forms a toner image on a recording medium; and a reading apparatus that reads the toner image on the recording medium, in which the pseudo-halftoning device is such that pseudo-halftoning is performed on a target image by using a threshold matrix, a parent matrix having a greater number of gray levels than number of gray levels of the target image is included, a threshold-value generating device is included, which generates, from the parent matrix, a threshold value used when performing the pseudo-halftoning on the target image, the threshold-value generating device generates a threshold value that varies according to a position of the target image and uses generated threshold value in the pseudo-halftoning performed on the target image, and the threshold value generated from the parent matrix is determined based on toner-image information data obtained by reading the toner image by the reading apparatus.

According to still another aspect of the present invention, there is provided an image forming apparatus including a pseudo-halftoning unit; an image forming unit that forms a toner image on a recording medium; and a reading unit that read the toner image on the recording medium, in which the pseudo-halftoning unit is such that pseudo-halftoning is performed on a target image by using a threshold matrix set including a plurality of threshold matrices, one threshold matrix for use is selected from the threshold matrix set according to a position of the target image to be used in the pseudo-halftoning performed on the target image, the threshold matrices in the threshold matrix set are identical with one another in periodic structure but different from one another only in a gradation characteristic, and a threshold matrix to be used is determined based on toner-image information data obtained by reading the toner image by the reading unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The present invention, which relates to a pseudo-halftoning device, makes use of an advantage in using a dither matrix incorporating tone conversion that tone conversion can be performed without gray-level missing. Put another way, the present invention aims to solve a problem that conventional tone conversion causes gray-level missing to occur and to allow tone conversion to be performed without gray-level missing.

Figure 1:
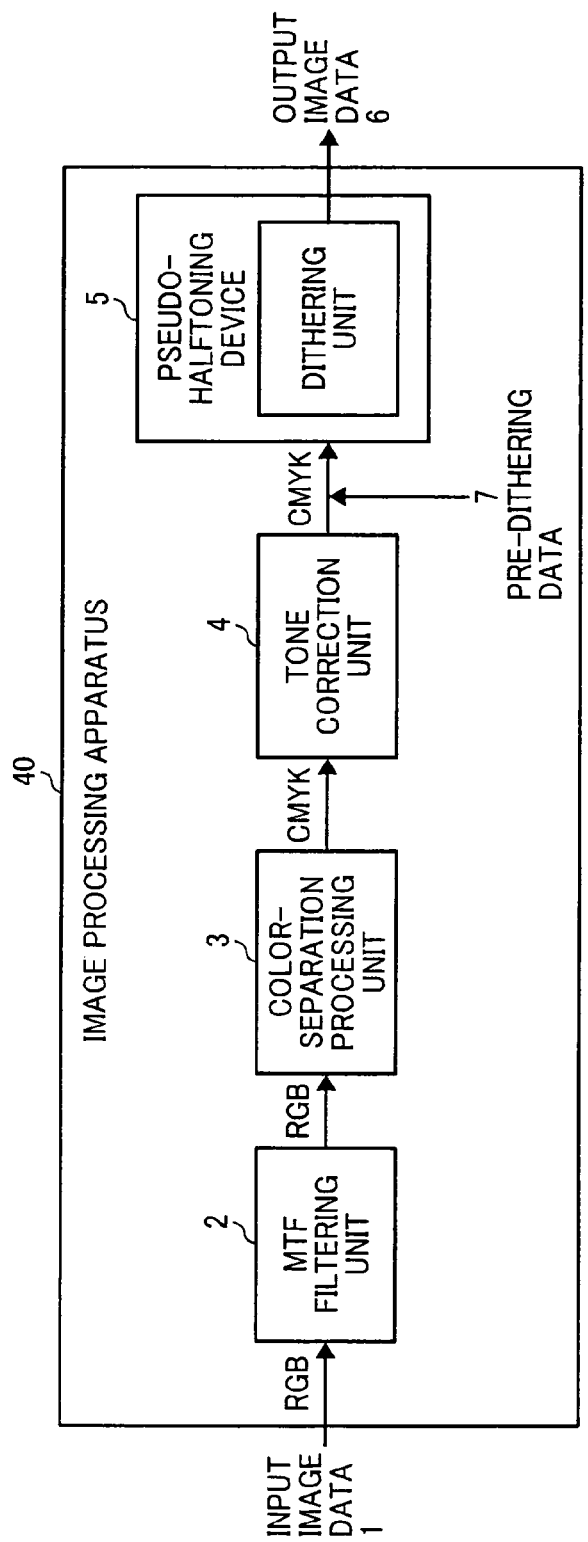
FIG. 1 is a diagram illustrating an image processing apparatus according to a first example.

Outlines of an image processing apparatus that includes the pseudo-halftoning device are described below. FIG. 1 is a schematic diagram illustrating a general image processing apparatus. It is assumed that input image data 1 fed to the image processing apparatus is multilevel (8-bit) image data from a personal computer or the like (When the image processing apparatus is a digital copying machine or the like, it is assumed that the input image data is fed from a scanner unit that scans an original). The input image data 1 is subjected to enhancement processing performed by a modulation transfer function (MTF) filtering unit 2. Subsequently, the image data is subjected to color conversion from red, green, and blue (RGB) color space to cyan, magenta, yellow, and black (CMYK) color space performed by a color-separation processing unit 3. The thus-converted image data is subjected to tone conversion performed by a tone correction unit 4. In the present invention, tone conversion for obtaining intended gradation characteristics is incorporated and performed in a pseudo-halftoning unit 5, which is a process to follow the tone conversion, whereas the tone correction unit 4 performs such tone conversion that is not appropriate to be performed by the pseudo-halftoning unit 5. Examples of such tone conversion include tone conversion that will cause a relatively small gray-level missing and in which it is needed to avoid reproducing new matrices.

The thus-converted image data is subsequently subjected to dithering, being pseudo-halftoning (which will be described in detail later) in the pseudo-halftoning unit 5. As will be described later, by performing the dithering by using threshold matrices that incorporate tone conversion, dithering and tone conversion can be performed simultaneously for obtaining intended gradation characteristics. By performing image processing operations as discussed above on the input image, output image data 6 is obtained. Detailed descriptions about an MTF filtering process, a color-separation process, and a tone correction process are omitted because conventional techniques can be employed for these processes.

The pseudo-halftoning device according to a first embodiment of the present invention is characterized in that a threshold matrix is a threshold matrix set including a plurality of threshold matrices, a threshold matrix to be used is selected from the threshold matrix set depending on the position of a target image and pseudo-halftoning is performed on the target image by using the selected threshold matrix, and the threshold matrices in the threshold matrix set are all identical in periodic structure but different only in gradation characteristics.

As discussed above, a phenomenon called color fluctuation occurs more or less in image forming apparatuses. The color fluctuation denotes a problem, in which in spite of the fact that images are desirably reproduced in the same colors, the images are reproduced in different colors due to variation in image-forming position caused by various causes. This color fluctuation problem brings about such a disadvantage that, even when the same tone conversion is performed at all positions in an image segment, intended gradation characteristics are obtained only at specific positions but not at all the positions in the image segment. In contrast, in the first embodiment of the present invention, because different threshold matrices are individually applied according to a position in an image, the threshold matrices can have different gradation characteristics. This allows intended gradation characteristics to be obtained every position in the image.

In the configuration in the first embodiment of the present invention, tone conversion is performed in a form of being incorporated in the threshold matrices. As discussed above, when tone conversion is incorporated in the threshold matrices, tone conversion can be performed without causing gray-level missing to occur. Preventing gray-level missing has important implications in the image processing apparatus according to the first embodiment of the present invention in some cases. This is because, when gray-level missing is prevented, each gray-level step can be set smaller than a visual limitation (minimum color difference, at which difference in gray levels is perceivable).

Furthermore, using the threshold matrices incorporating gradation characteristics makes boundaries between segments (segments, to which different threshold matrices are to be applied) defined by segmentation visually less noticeable. This is because usage of the threshold matrices incorporating gradation characteristics advantageously reduces difference from intended colors. It has been relatively difficult to attain intended colors completely by performing conventional tone conversion because of a limit placed on the number of gray levels. Hence, difference from intended colors has been relatively large, making boundaries between segments easily noticeable.

In the first embodiment of the present invention, as discussed above, the configuration is such that tone conversion is performed on a per-image-forming-position basis (configuration is such that threshold matrices incorporating different gradation characteristics are applied to different image forming positions). More specifically, tone conversion, in which tone conversion for causing an output image to have intended gradation characteristics (conventionally performed tone conversion) and tone conversion that corrects variations in image position are combined, is performed. As discussed above, in the first embodiment of the present invention, substantially two types of tone conversions are to be performed. If such two types of tone conversions are performed by a conventional tone conversion technique that causes gray-level missing (tone conversion of converting 8-bit input image data into 8-bit image data), magnitude of gray-level missing further increases, which results in degrading, image quality. In the first embodiment of the present invention, threshold matrices incorporating gradation characteristics are employed for addressing such problem. This allows tone conversion that does not cause gray-level missing and that is appropriate for each of different image forming positions to be performed, so that intended gradation characteristics are attained at every image forming position without causing color fluctuation.

In addition, as will be described later, threshold matrices identical in periodic structure but different only in gradation characteristics are employed. Accordingly, not only gradation characteristics are the same across all the image forming positions but also a periodic structure (screen ruling and screen angles in dithering) is the same across all the image forming positions. This makes boundaries between different threshold matrices substantially visually unnoticeable. Thus, with the configuration according to the present embodiment, intended gradation characteristics can be attained at every image forming position while making boundaries between different threshold matrices visually unnoticeable.

A pseudo-halftoning device according to a second embodiment of the present invention is such that a threshold matrix is a threshold matrix set including a plurality of threshold matrices, and a threshold matrix to be used is selected from the threshold matrix set and pseudo-halftoning is performed on a target image by using the selected threshold matrix, depending on the position of the target image. The pseudo-halftoning device according to the second embodiment differs from the device according to the first embodiment in that all the threshold matrices in the threshold matrix set are generated from a single parent matrix (a matrix having a higher degree of freedom in the number of gray levels).

Threshold matrices generated from a single parent matrix are identical in periodic structure and therefore have the same screen ruling and screen angle. This is because the threshold matrices are generated by modifying gradation characteristics of the parent matrix by making use of the condition that the parent matrix has the higher degree of freedom in the number of gray levels. Even when gradation characteristics of the parent matrix are modified, the periodic structure does not change. Thus, the configuration according to the second embodiment, in which all the threshold matrices are identical in periodic structure, satisfies constituent features for the device according to the first embodiment. Note that the first embodiment can include a configuration where threshold matrices are identical in periodic structure but not generated from a single parent matrix.

This configuration according to the second embodiment also satisfies the constituent features according to the first embodiment discussed above. Put another way, also with the configuration of the second embodiment, it is allowed to apply different threshold matrices each depending on a position in an image, thereby enabling to impart different gradation characteristics to each of the threshold matrices, so that intended characteristics can be attained at every position in the image. The problems that come along with attaining the intended gradation characteristics at every position in the image in this manner can be solved simultaneously. More specifically, the problem of gray-level missing that is caused when substantially two types of tone conversions are performed can be solved by using the threshold matrices incorporating gradation characteristics. The other problem of visually-noticeable boundaries between different threshold matrices can be solved by using the threshold matrices having the same periodic structure to make the boundaries between different threshold matrices visually unnoticeable.

In the second embodiment, all the threshold matrices in the threshold matrix set are generated from a single parent matrix. Hence, during a process for generating threshold matrices having a predetermined number (typically, 8 bits providing 256 gray levels, but not limited to 8 bits) of gray levels from a parent matrix having a large degree of freedom in the number of gray levels, it is needed to take only gradation characteristics of the threshold matrices into consideration, and it is not needed to take into consideration other items needed when generating threshold matrices, such as periodic structure (screen ruling, screen angle, and the like) and dot-growth order (growing in the depth direction, growing in the plane direction, or the like). This is because these items have been determined during production of the parent matrix and are unchangeable in the process of generating the threshold matrices from the parent matrix. In the second embodiment, threshold matrices that are identical with one another in periodic structure (screen ruling and screen angle) but different from one another only in gradation characteristics are to be generated. Accordingly, generating threshold matrices from a parent matrix as discussed above is convenient and allows simplification of the process for obtaining threshold matrices.

As a matter of course, in contrast, threshold matrices in the threshold matrix set can be generated to be independent from one another rather than related to one another (rather than generated from the same parent matrix) (such a configuration corresponds to the first embodiment). However, the configuration that contributes to the second embodiment is the threshold matrices that are identical in periodic structure but different only in gradation characteristics, so that generating independent threshold matrices is disadvantageous in that an additional generating process is caused, making the generating process complicated.

As discussed above, the second embodiment yields not only the same effect as that in the first embodiment but also the effect of simplifying the process for generating the threshold matrices belonging to the threshold matrix set.

A pseudo-halftoning device according to a third embodiment differs from that of the first and the second embodiments discussed above in that threshold values in threshold matrices are calculated, rather than by using threshold matrices, from a parent matrix while incorporating gradation characteristics in the threshold values at each use (each time when threshold values are to be used in dithering). In the second embodiment, all the threshold values in the threshold matrices are calculated in advance and stored in a memory in the form of the threshold matrices. In contrast, in the third embodiment, threshold values are calculated at each use, and, after dithering has been performed, the used threshold values, which are results of the calculation, are not stored in a memory.

In other words, the configuration according to the third embodiment differs form the configuration according to the second embodiment in whether threshold values are to be generated at use or threshold values have been generated in advance and stored. Accordingly, the configuration of the third embodiment yields similar effect to that by the configuration of the second embodiment. More specifically, also with the configuration according to the third embodiment, threshold values each having different gradation characteristics can be applied according to an image position. This allows intended gradation characteristics to be attained in every image position. The problems that come along with attaining the intended gradation characteristics at every position in the image in this manner can be solved simultaneously. More specifically, by using the thresholds incorporating gradation characteristics, the problem of gray-level missing that is caused when substantially two types of tone conversions are performed can be solved. The other problem of visually-noticeable boundaries between different threshold matrices can be solved by making the periodic structure after performing pseudo-halftoning be the same with use of the threshold values generated from a parent matrix to make the boundaries between different gradation characteristics visually unnoticeable.

Furthermore, in the third embodiment, threshold values for use in dithering are generated from the parent matrix after incorporating gradation characteristics therein at each use. This yields the effect below. With the configuration of the second embodiment, the entire threshold matrix set including the threshold matrices, in which different gradation characteristics are incorporated on a position-by-position basis, needs to be stored in a memory, leading to the need for a relatively large storage capacity. In contrast, with the configuration of the third embodiment, it is only needed to store information necessary for expressing different gradation characteristics on a position-by-position basis. Accordingly, the configuration of the third embodiment is advantageous in that necessary storage capacity can be made considerably smaller than the configuration of the second embodiment.

A first embodiment of the image forming system of the present invention includes the pseudo-halftoning device according to any one of the first to third embodiments discussed above and an image forming apparatus that forms a toner image on a recording medium, such as paper. The image forming system configured to include the pseudo-halftoning device discussed above is capable of solving a problem such as the color fluctuation (to be more exact, color fluctuation with regularity) that is difficult to avoid in the image forming apparatus. More specifically, the color fluctuation problem can be solved by setting different gradation characteristics on a per-image-position basis of the pseudo-halftoning device in such a manner as to cancel the color fluctuation specific to the image forming apparatus.

As discussed above, conventional image forming systems have suffered from the color fluctuation problem that makes it difficult to reproduce images in intended colors at every position in an image. However, the image forming system of the first embodiment is capable of solving the color fluctuation problem and reproducing an image in intended colors at every position in the image.

Each of second to fourth embodiments of the image forming system of the present invention includes, in addition to any one of the first through the third embodiments of the pseudo-halftoning device discussed above, an image forming apparatus that forms a toner image on a recording medium and a reading apparatus that read the toner image on the recording medium. In addition, the image forming systems according to any one the second to the fourth embodiments are configured such that different gradation characteristics are determined on a per-position basis in the pseudo-halftoning device based on toner-image information data obtained by the reading apparatus reading the toner image formed on the recording medium by the image forming apparatus. The pseudo-halftoning device according to the first embodiment only uses different threshold matrices on an image-position-by-image-position basis, whereas the image forming system of the second embodiment of the present invention determines different threshold matrices on an image-position-by-image-position basis based on the toner-image information data. Note that the pseudo-halftoning device according to the second embodiment also uses different threshold matrices on an image-position-by-image-position basis.

The third embodiment of the image forming system of the present invention generates different tone characteristic of the threshold matrices on an image-position-by-image-position basis based on the toner-image information data. The pseudo-halftoning device according to the third embodiment generates, from a parent matrix, only threshold values, in which gradation characteristics are incorporated, to be different from one another on an image-position-by-image-position basis without producing threshold matrices.

The fourth embodiment of the image forming system of the present invention determines these threshold values that differ from one another on an image-position-by-image-position basis based on the toner-image information data.

Put another way, any one of the second to the fourth embodiments of the image forming system of the present invention configured as discussed above is capable of accommodating variations in a condition related to the color fluctuation of the image forming apparatus over a long-term use of the image forming apparatus and/or replacement of a part in the image forming apparatus. More specifically, it is conceivable that uneven wear of a photosensitive layer on the photosensitive drum, a change in a development gap, or the like, changes the color fluctuation condition. Even when the color fluctuation condition of the image forming apparatus has changed, it is possible to change and re-set the different gradation characteristics on the position-by-position basis of the pseudo-halftoning device based on the toner-image information data obtained by the reading apparatus. Accordingly, even when the color fluctuation condition has changed, different gradation characteristics can be set on an image-position-by-image-position basis of the pseudo-halftoning device in such a manner as to cancel the color fluctuation condition that has thus been changed. Hence, it is possible to solve the problem that the color fluctuation condition changes over a long-term use of the image forming apparatus.

As discussed above, any one of the second to the fourth embodiments of the image forming system of the present invention not only solves the regular color fluctuation problem but also allows an image to be reproduced in intended colors accurately at every position in the image even when the color fluctuation condition has changed from an initial condition due to a long-term use, part replacement, or the like.

Each of a fourth embodiment of the pseudo-halftoning device according to the present invention and a fifth embodiment of the image forming system according thereto is characterized in that, in addition to the configuration of any of the embodiments discussed above, segments, to which different gradation characteristics are to be applied on a position-by-position basis in the pseudo-halftoning device, are not of a uniform size. More specifically, in the configuration of the present embodiments, a segment, to which one set of gradation characteristics is applied, is small whereas another segment, to which another set of gradation characteristics is applied, is large.

According to the present invention, the color fluctuation problem is solved by using threshold matrices that incorporate different gradation characteristics on an image-position-by-image-position basis therein, so that an image is reproduced in intended colors at every image segment. Therefore, for a segment where the color fluctuation occurs in a small area (i.e., colors change drastically in a relatively small area), the problem that reproduced colors vary on a position-by-position basis cannot be solved unless the size of a segment, to which the same set of gradation characteristics is to be applied, is made small. Put another way, in a situation where the color fluctuation has occurred within a segment, to which the same set of gradation characteristics is to be applied, intended colors cannot be reproduced. In contrast, for a segment where the color fluctuation occurs over a wide area, there is no problem in setting the size of a segment, to which the same set of gradation characteristics is to be applied, large; or, under such a condition, setting the size of a segment, to which the same set of gradation characteristics is to be applied, too small yields a negative effect that more threshold matrices than required are to be stored.

In consideration of the circumstances discussed above, each of the fourth embodiment of the pseudo-halftoning device of the present invention and the fifth embodiment of the image forming system according thereto is configured such that segments, to which the same set of gradation characteristics is to be applied, can be of different sizes rather than of a uniform size. This allows the size of a segment, in which the color fluctuation occurs in a small area, to be set relatively small whereas the size of a segment, in which the color fluctuation occurs over a wide area, to be set relatively large. Hence, it is possible to address the color fluctuation that occurs in a small area and further prevent unnecessary increase in the number of segments, to which threshold matrices with different gradation characteristics are to be applied. The greater the number of segments, to which threshold matrices with different gradation characteristics are applied, the greater the storage capacity of a memory necessary for storing the threshold matrices. Each of the fourth embodiment of the pseudo-halftoning device of the present invention and the fifth embodiment of the image forming system according thereto is capable of addressing such a sharp color fluctuation without increasing storage capacity of a memory.

As discussed above, each of the fourth embodiment of the pseudo-halftoning device of the present invention and the fifth embodiment of the image forming system according thereto is capable of solving the color fluctuation problem as with any one of the embodiments discussed above, and also preventing unnecessary increase in the number of threshold matrices to be stored even in a situation where the color fluctuation occurs in a small area.

Each of a fifth embodiment of the pseudo-halftoning device of the present invention and the fourth embodiment of the image forming system according thereto is characterized in that, in addition to the configuration of any of the embodiments discussed above, the number of segments, to which different gradation characteristics are to be applied (the number of segments segmented according to gradation characteristics), is from 3 to 10 in each of the length direction and the width direction of an A3-size recording medium.

Generally, as a visual limitation of color difference, approximately $\Delta E=3$ is often cited. It is assumed in the present invention that the color fluctuation with $\Delta E$ of approximately 10 occurs in an output image of an A3-size recording medium, and the present invention is aimed at further reduction in this color difference. The reason why it is assumed that $\Delta E$ is 10 is described below. In a condition where the color fluctuation exhibiting $\Delta E$ higher than 10 occurs, reliability in color is considerably low. Under such a condition, determining and removing the cause of the color fluctuation are to be performed with the highest priority. In contrast, in a condition where the color fluctuation has $\Delta E$ of approximately 10, although occurrence of the color fluctuation is visible, the condition is allowable for many usages. Accordingly, in this condition, it is required to reduce $\Delta E$ of approximately 10 relatively inexpensively. Hence, it is assumed in the present invention that color difference is to be reduced from a condition where $\Delta E$ is approximately 10 for an A3-size recording medium.

By segmenting an A3-size recording medium into three or four segments, to which different gradation characteristics are to be applied, the condition exhibiting $\Delta E$ of approximately 10 can be improved to a condition exhibiting $\Delta E$ of approximately 3. However, the color fluctuation does not always occur in one direction in an A3-size recording medium; accordingly, the color fluctuation problem can be solved by segmenting an A3-size recording medium in each of the length direction and the width direction. As described above, in a situation where the color fluctuation occurs in a small area, segmentation into smaller segments is needed. It is considered that such a problem can be solved by setting a maximum number of segments in one direction to approximately 10.

Hence, each of the fifth embodiment of the pseudo-halftoning device of the present invention and the fourth embodiment of the image forming system according thereto configured as discussed above is capable of reducing the color fluctuation exhibiting $\Delta E$ of approximately 10 in an A3-size recording medium to that of approximately 3, and also capable of addressing the color fluctuation that occurs in a small area.

Each of a sixth embodiment of the pseudo-halftoning device of the present invention and a fifth embodiment of the image forming system according thereto is characterized in that a periodicity of segments, to which different gradation characteristics are to be applied, is equal to a periodicity of an element other than the sheet size. More specifically, the periodicity is equal to a decentering periodicity of the photosensitive drum. Put another way, the different gradation characteristics are applied to correspond to image forming positions on the photosensitive drum. This reduces the color fluctuation caused by decentering of the photosensitive drum, thereby allowing images to be reproduced in intended colors.

In a sixth embodiment of the image forming system of the present invention, the reading apparatus obtains the toner-image information data by reading toner images on a plurality of recording media. When the toner-image information data is obtained by reading a plurality of toner images in this manner, elements exhibiting regularity can be extracted from the whole color fluctuation based on the toner-image information data of the toner images. As discussed above, there are the color fluctuation with regularity and the color fluctuation without regularity. Tone correction can be performed by obtaining an average of the thus-read plurality of toner images or the like to extract only the color fluctuation with regularity. However, when the toner-image information data is obtained by reading only one image, tone correction is performed inclusive of color fluctuation without regularity. With this tone correction, images are not always reproduced in intended colors, which is disadvantageous. The sixth embodiment provides a solution to such a problem. The sixth embodiment can also address the color fluctuation having a periodicity across a plurality of images.

EXAMPLES

First Example

Dithering to be performed by a pseudo-halftoning device according to the first example is described below.

The device according to the first example is configured to perform dithering by using a threshold matrix selected from a threshold matrix set according to a position in a target image. In the first example, as discussed above, threshold matrices to be used differ from one another depending on a position in a target image; however, dithering, which is to be performed after the threshold matrix has been selected, does not vary depending on a position in the target image. Accordingly, overview of the dithering is described below.

In the first example, 4-bit dithering for outputting 4-bit (16 values) data as pseudo-halftoned data is performed. The 4-bit dithering is performed by converting 8-bit data (hereinafter, "pre-dithering data", presented in FIG. 1) (each pixel is represented by 256 gray levels from 0 to 255), which is obtained by performing the image processing discussed above on input image data, into the output image data 6 representing each pixel by 16 gray levels from 0 to 15. This conversion is performed by comparing a gray level (256 gray levels) of each pixel of pre-dithering data 7 with a threshold value stored in the form of a threshold matrix (stored in a memory or a hard disk of the image processing apparatus, or the like) to determine which gray level from 0 to 15 each pixel belongs to. The threshold matrix for use in the 4-bit dithering includes 15 tables each containing threshold values. This dithering for obtaining the output image data 6 from the pre-dithering data 7 is substantially the same as dithering that has conventionally been performed. A technique for obtaining the output image data 6 by performing such dithering is described in detail in Japanese Patent Application Laid-open No. 2000-299783 (more specifically, in paragraphs 0036 to 0040), and descriptions about the dithering are omitted.

In the dithering according to the first example discussed above, it is assumed that the quantization bit length is 4 bits (16 values); however, other quantization bit length does not obstruct the effects of the present invention. For instance, the quantization bit length can be 1 bit, 2 bits, or 8 bits, or, 3 values or 5 values. So long as dithering for forming a toner image having such a periodic structure as will be discussed below is performed, the same effects can be obtained in any quantization bit length.

Figures 2, 3:
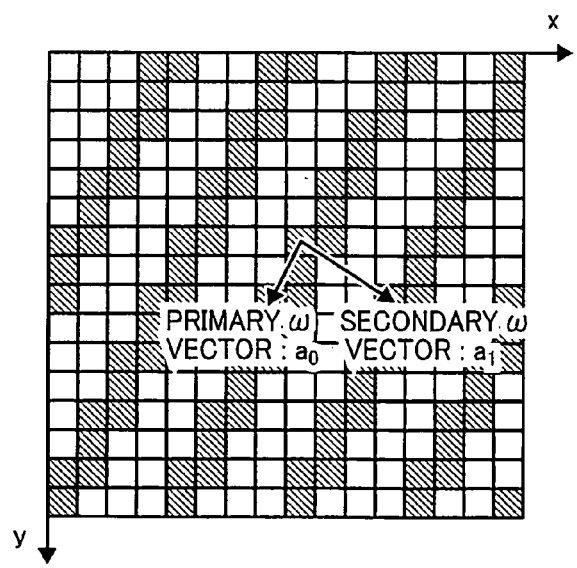
FIG. 2 is a conceptual diagram of segmentation performed by a pseudo-halftoning device according to the first example.
FIG. 3 is a diagram illustrating relationships among a periodic structure, primary and secondary vectors, and screen angle and screen ruling in a line screen structure.

The pseudo-halftoning device according to the first example segments the input image data into 25 segments (5 segments in each of the length direction and the width direction) and performs the dithering of the segments by using different threshold matrices. More specifically, the pseudo-halftoning device performs dithering as follows. The pre-dithering data 7 is segmented into segments A1 to A25 as illustrated in FIG. 2. Referring to FIG. 2, from a pseudo-halftoning standpoint, an image area (the area in a box indicated by thick lines in FIG. 2 and corresponding to A3 size) is segmented into the segments A1 to A25 each enclosed in dotted lines. The segments are subjected to dithering performed by using different threshold matrices D1 to D25 (which will be described later in detail). In the first example, dithering is performed by selecting, for each of the segments, a threshold matrix from a threshold matrix set including the threshold matrices D1 to D25. The threshold matrices D1 to D25 are generated to be identical in periodic structure but different only in gradation characteristics. Although the pre-dithering data 7 is segmented into 25 segments as illustrated in FIG. 2 in the first example, as a matter of course, the number of segments can be other than 25 and other segmenting way can be employed.

In the first example, the threshold matrices have a linear periodic structure; that is, the threshold matrices have what is called a line screen structure (when dithering is performed by using these threshold matrices, the output image data 6 having a linear periodic structure is obtained). As numerical values characterizing a periodic structure of a dither matrix, screen angle and screen ruling are generally used. Hence, the screen angle and the screen ruling in the line screen structure are described below.

For dither matrices having such a periodic structure as illustrated in FIG. 3, the screen angle and the screen ruling are uniquely calculated by the following equations. In other words, the screen angle, the screen ruling, the primary vector, and the secondary vector are calculated from Equations (1) to (4).

$$\text{primary vector: } a_0^\omega = (a_{0x}, a_{0y}) = (-1, 2) \quad (1)$$

$$\text{secondary vector: } a_1^\omega = (a_{1x}, a_{1y}) = (3, 2) \quad (2)$$

$$\text{screen ruling} = (\text{resolution}) \times \sqrt{a_{0x}^2, a_{0y}^2} / |a_{0x} a_{1y} - a_{0y} a_{1x}| \quad (3)$$

$$\text{screen angle} = a\tan 2(a_{0x}, a_{0y}) \quad (4)$$

Generally, a two-dimensional periodic structure is conveniently expressed by 2 two-dimensional vectors. The two vectors are referred to as the primary vector and the secondary vector below. The threshold matrices of the first example can be expressed by using the primary vector and the secondary vector as presented in Table 1.

TABLE 1

| No. | Screen ruling [lpi] | Angle [deg.] | a0x | a0y | a1x | a1y |
|---|---|---|---|---|---|---|
| First example | 191.7 | 116.6 | −1 | 2 | 3 | 1 |

Figure 4:
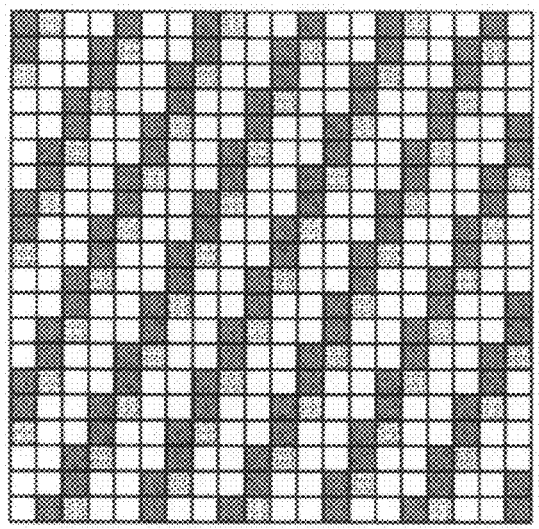
FIG. 4 is a diagram illustrating a dither periodic structure (area ratio: 30%) according to the first example.
Figure 5:
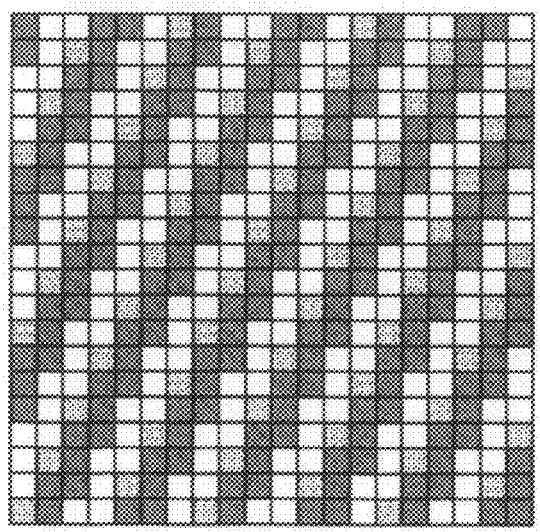
FIG. 5 is a diagram illustrating a dither periodic structure (area ratio: 50%) according to the first example.

FIG. 4 and FIG. 5 actually illustrate periodic structures formed by using the threshold matrices having the primary vector and the secondary vector given in Table 1. FIG. 4 illustrates a dither pattern where an image area ratio is 30%. FIG. 5 illustrates a dither pattern where the image area ratio is 50%.

The pseudo-halftoning device of the first example performs dithering to generate the output image data 6 having the periodic structure given in Table 1. The configuration is such that the output image data 6 is generated so that each of the threshold matrices D1 to D25 has the periodic structure given in Table 1. The threshold matrices D1 to D25 are identical with one another in screen ruling and screen angle.

In the first example, although it is assumed that the threshold matrices have the linear periodic structure, as a matter of course, the threshold matrices can have other periodic structure. The threshold matrices can be what is called a dot screen having a dot periodic structure. The screen ruling and the screen angle are not limited to the values given in Table 1 in the present invention. Furthermore, it is possible to adapt for use as pseudo-halftoning for blue noise or green noise, which has a nonperiodic structure as mentioned above in the discussion about the conventional technique. Generally, blue noise and green noise are assumed to have a nonperiodic structure; however, to be more exact, blue noise and green noise have a periodic structure because a finite-sized threshold matrix is to be used. Note that each of the periodicity of blue noise and that of green noise is longer by far than that of the line screen structure or the dot screen structure.

The threshold matrices D1 to D25 have gradation characteristics that are not the same but different from one another. How to incorporate gradation characteristics in the threshold matrix is described below.

Each of the threshold matrices D1 to D25 of the first example is a threshold matrix with 7 by 7 pixels of 4 bits. Hence, a total number of gray levels is 736 (=15×7×7+1). In other words, the threshold matrices of the first example are capable of providing 736 gray levels. A total number of gray levels of the threshold matrices can be set to a large value easily by generating a large threshold matrix by using what is called a super matrix.

One of 255 values from 0 to 254 is to be assigned to each of threshold values in the threshold matrices because the pre-dithering data 7 is 8-bit data. By causing the number of the threshold values to vary from one position to another rather than uniform, intended gradation characteristics can be incorporated in the threshold matrices. This can be implemented by setting, for a segment where a change in the gray levels is desirably sharp, the number of the threshold values assigned thereto relatively large whereas, for a segment where a change in the gray levels is desirably moderate, the number of the threshold values assigned thereto relatively small. More specifically, all the 736 gray levels that can be provided by the threshold matrices are determined in advance. For instance, the 736 gray levels can be determined by actually outputting an image to perform color measuring. The 256 gray levels to be expressed with the pre-dithering data 7 are also determined in advance. Generally, the 256 gray levels are determined according to intended gradation characteristics. The threshold matrices are generated by assigning the numbers from 0 to 255 to the threshold matrices (735 positions in the threshold matrices of the first example) based on relationships between both of them in such a manner as to obtain the intended gradation characteristics. In the first example, the threshold matrices D1 to D25, in which the gradation characteristics are incorporated, belonging to the threshold matrix set are generated to have different gradation characteristics in this manner.

With the first example, the color fluctuation problem discussed above can be solved by causing the gradation characteristics incorporated in the threshold matrices D1 to D25 to differ from one another. In other words, the problem that reproduced colors vary depending on a position of the output image in an image forming apparatus can be corrected. In the first example, the gradation characteristics to be incorporated in the threshold matrices are determined as gradation characteristics G1 to G25 for the image segments A1 to A25 in the pre-dithering data 7, respectively. The gradation characteristics G1 to G25 determined on a segment-by-segment basis are imparted with characteristics to correct the color fluctuation pertaining to a target output device. The gradation characteristics G1 to G25 are determined by outputting gradation patches each for a corresponding one of the segments A1 to A25 of the output device and measuring colors of the gradation patches. In the first example, the gradation characteristics G1 to G25 determined in this manner on a segment-by-segment basis are incorporated in the threshold matrices, thereby generating the threshold matrices D1 to D25.

Figure 6:
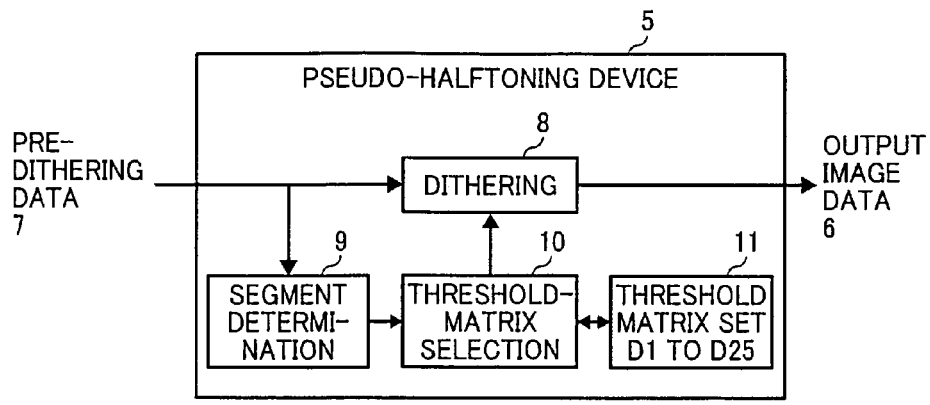
FIG. 6 is a diagram illustrating a pseudo-halftoning device according to the first example.

FIG. 6 is a schematic diagram of the pseudo-halftoning device according to the first example of the present invention discussed above. In the pseudo-halftoning device according to the first example, when each of a dithering unit 8 and a segment determining unit 9 has received the pre-dithering data 7, the segment determining unit 9 performs segment determination on a target pixel to determine which one of the image segments A1 to A25 the target pixel belongs to. A threshold-matrix selecting unit 10 selects, based on a result of the segment determination, a dither matrix appropriate for a target segment from the threshold matrices D1 to D25 set in a threshold matrix set unit 11 and sets the dither matrix so that the dithering unit 8 can use the dither matrix. The dithering unit 8 performs dithering on the pre-dithering data 7 by using the threshold matrix appropriately selected in this manner and outputs the output image data 6.

Meanwhile, a scheme of generating the threshold matrices D1 to D25 configured to reduce the color fluctuation in advance during manufacturing of the image forming apparatus and storing the threshold matrices so that a user of the image forming apparatus can continue using the threshold matrices can be employed, for instance.

As will be described later, in the first example, by performing dithering with use of the threshold matrices incorporating tone conversion, dithering and tone conversion are performed simultaneously so that intended gradation characteristics are obtained. By performing such image processing on an input image, the output image data 6 is obtained. Detailed descriptions about the MTF filtering process, the color-separation process, and the tone correction process discussed above, except for about the pseudo-halftoning device configuring an image processing apparatus according to the first example, which will be described later, are omitted because conventional techniques can be employed for these processes. The pseudo-halftoning device according to the first example functions as one of constitutional elements of such an image processing apparatus and the present invention has a feature in this pseudo-halftoning portion.

Second Example

A pseudo-halftoning device according to the second example of the invention is identical with the pseudo-halftoning device according to the first example in many portions. However, the second example partially differs from the first example in the process for generating the threshold matrices. As mentioned above in the description about the first example, different gradation characteristics are incorporated in the threshold matrices D1 to D25 in the threshold matrix set of the first example, and a restriction that the threshold matrices are to have the same periodic structure (screen angle and screen ruling) is imposed on the threshold matrices. The same goes for the threshold matrices of the second example. Note that no other restriction is imposed on the threshold matrices D1 to D25 of the first example other than that the threshold matrices D1 to D25 are to have the same periodic structure. Put another way, in the first example, the dither matrices D1 to D25 are not necessarily associated with one another so long as the dither matrices have the same periodic structure (the threshold matrices D1 to D25 can be generated independently from one another). Table 2 presents screen ruling and screen angles in dithering for each of cyan (C), yellow (Y), magenta (M), and black (K) in the second example.

TABLE 2

| No. | Screen ruling [lpi] | Angle [deg.] | a0x | a0y | a1x | a1y |
|-----|---------------------|--------------|-----|-----|-----|-----|
| C | 212.1 | 45.0 | 2 | 2 | 2 | −2 |
| M | 212.1 | 135.0 | −2 | 2 | 2 | 2 |
| Y | 200.0 | 0.0 | 3 | 0 | 0 | −3 |
| K | 200.0 | 90.0 | 0 | 3 | 3 | 0 |

In contrast, in the second example, each of the threshold matrices D1 to D25 is generated from a parent matrix that has a higher degree of freedom in the number of gray levels than the threshold matrices and is generated in advance. How to generate the threshold matrices is described below based on the discussion made for the first example. To generate the threshold matrices having the same periodic structure as that of the first example, as discussed above, the threshold matrices can provide 736 gray levels as a maximum total number of gray levels. A threshold matrix, to which numbers from 0 to 734 are assigned, is once generated to be used as a parent matrix. Subsequently, the threshold matrices, to which the numbers 0 to 254 are assigned while incorporating the intended gradation characteristics therein, are generated by determining relationships between the numbers 0 to 734 and the numbers 0 to 254 according to the intended gradation characteristics. In the second example, the threshold matrices D1 to D25 incorporating different gradation characteristics on an image-segment-by-image-segment basis are generated from the single parent matrix by determining the relationships between the numbers 0 to 734 and the numbers 0 to 254 for each of the image segments A1 to A25 in the pre-dithering data 7. The threshold matrices generated from the same parent matrix are, as a matter of course, identical in periodic structure. This is because the periodic structure is determined at the point in time when the parent matrix, to which the numbers 0 to 734 are assigned, has been determined.

In the foregoing discussion, the parent matrix is generated with all the gray levels; however, the parent matrix can be generated with the number of gray levels smaller than the total number of gray levels (note that if the number of gray levels is smaller than the number of gray levels of the pre-dithering data 7, gray-level missing can occur). Generating the parent matrix with the number of gray levels smaller than the total number of gray levels is advantageous in that, for instance, it is possible to prevent a pattern including low-frequency components in the output image data 6 from occurring.

Third Example

A pseudo-halftoning device according to the third example of the invention is identical with the pseudo-halftoning device according to the first example and the second example in many portions. However, the difference between the third example and the first and second examples is whether final threshold matrices are generated and stored or not.

In the second example, the threshold matrices D1 to D25 incorporating the different gradation characteristics are generated for the image segments A1 to A25, respectively, and dithering is performed by selectively using one of the threshold matrices on a per-image-segment basis. In the second example, the threshold matrices D1 to D25 are generated from the parent matrix by causing each of the threshold matrices D1 to D25 to reflect necessary gradation characteristics for a corresponding one of the image segments. More specifically, relationships between the numbers 0 to 734 and the numbers 0 to 254 are determined on an image-segment-by-image-segment basis; the threshold matrices D1 to D25 are generated by causing the relationships to reflect in the parent matrix; the threshold matrices D1 to D25 are held (stored); and dithering is performed by using the stored threshold matrices. In the third example, dithering is performed by a similar procedure to that of the second example; however, the threshold matrices D1 to D25 are not generated in the third example. The third example is identical with the second example in that a parent matrix is to be used and that relationships, between the numbers 0 to 734 and the numbers 0 to 254, for causing gradation characteristics to reflect in the threshold matrices necessary for each image segment are determined in advance. The relationships are the gradation characteristics G1 to G25 to be incorporated in the dither matrices for obtaining intended gradation characteristics.

As discussed above, dithering is performed by comparing a gray level of each pixel in the pre-dithering data 7 with a corresponding threshold value in the threshold matrix to obtain the output image data 6. Therefore, what are finally required in dithering is individual threshold values in the threshold matrices. In the third example, threshold values necessary to perform the dithering are generated from a parent matrix each time as necessitated. More specifically, the dithering is performed by calculating the threshold values necessary to perform the dithering from the parent matrix and the relationships between the numbers 0 to 734 and the numbers 0 to 254 determined on the image-segment-by-image-segment basis.

Figure 7:
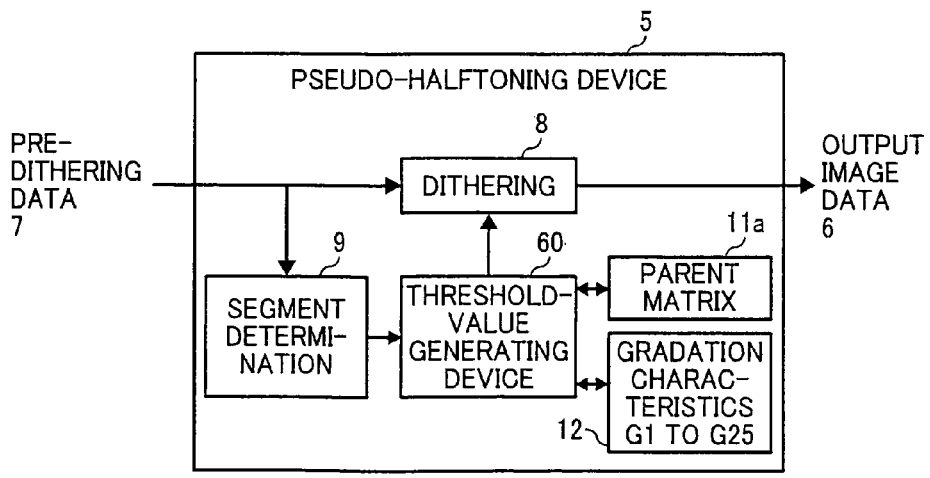
FIG. 7 is a diagram illustrating a pseudo-halftoning device according to a third example.

FIG. 7 is a schematic diagram illustrating the pseudo-halftoning device according to the third example. In the third example, as discussed above, the threshold values for use by the dithering unit 8 are not stored in the form of threshold matrices, but the pseudo-halftoning device includes a parent matrix unit 11a and a gradation-characteristics holding unit 12 that holds the gradation characteristics G1 to G25 to be incorporated in the dither matrices on the image-segment-by-image-segment basis. Hence, the third example is configured such that a threshold-value generating device 60 illustrated in FIG. 7 generates the threshold values each time as necessitated.

Also in the third example, the threshold values for all the image segments are calculated from the single parent matrix. Hence, a result (the output image data 6) of the dithering is completely identical with that of the second example. Accordingly, in the third example, the post-dithering data has the same periodic structure (screen angle and screen ruling) all across the image segments (A1 to A25).

Fourth Example

The fourth example of the present invention illustrates a full-color image forming system that includes an image processing apparatus including the pseudo-halftoning device of any one of the first to third examples and a full-color image forming apparatus that forms a full-color image on a recording medium with toner images of four colors, CMYK. The image processing apparatus of the image forming system of the fourth example is the same as that of the first example. Accordingly, the full-color image forming apparatus that receives the output image data 6 from the image processing apparatus as a result of processing and forms a toner image on a recording medium, such as paper, is mainly described below.

Figure 8:
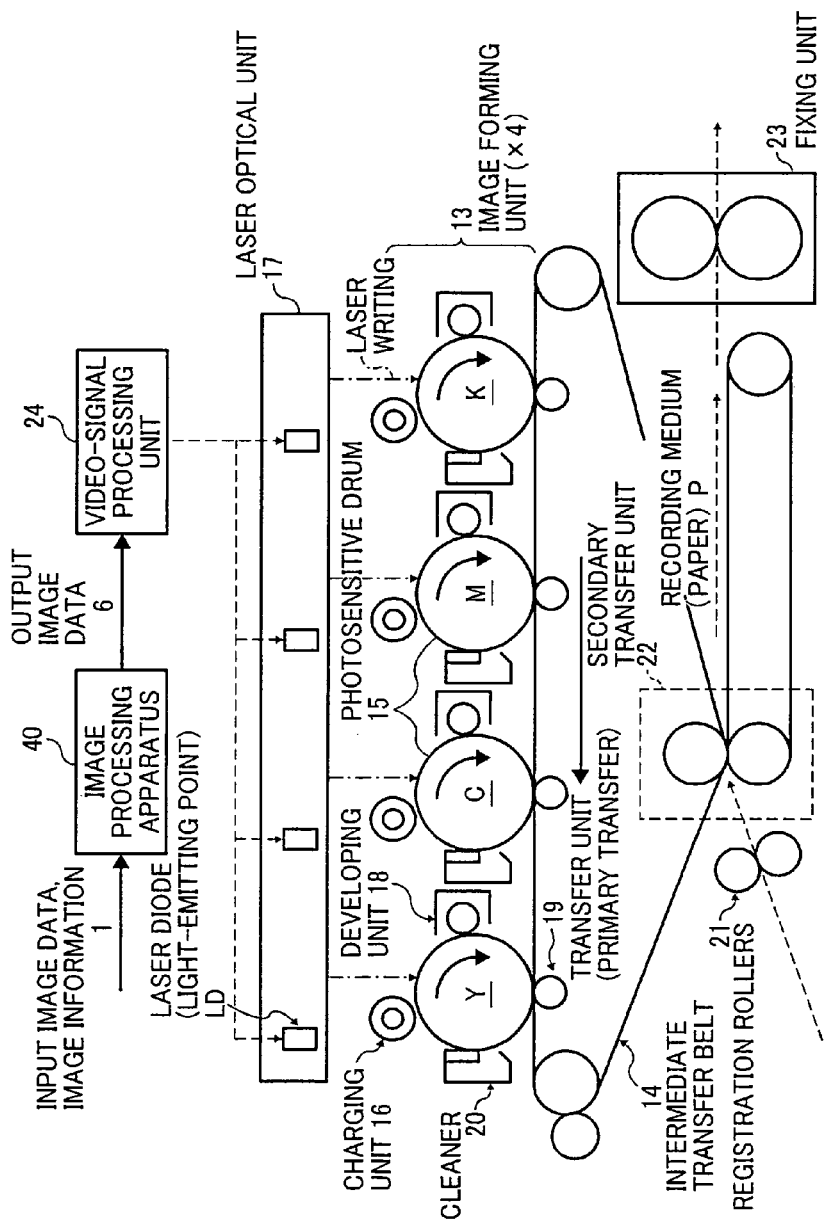
FIG. 8 is a diagram illustrating a full-color image forming apparatus according to a fourth example.

FIG. 8 is a schematic diagram of the full-color image forming apparatus according to the fourth example. The full-color imaging apparatus of the fourth example is an image forming apparatus that forms an image by superimposing, on a recording sheet (a recording medium, such as paper), images of four color components of yellow (Y), cyan (C), magenta (M), and black (K) on one another. In the fourth example, four image forming units 13, each for a corresponding one of the four color components, CMYK, are arranged as illustrated in FIG. 8. The toner images of the four color components formed by the image forming units 13 are sequentially transferred onto a belt-like intermediate transfer member (intermediate transfer belt) 14 that is in contact with the four image forming units 13. The intermediate transfer member 14 is rotated by a driving unit (not shown) at given timing, so that the toner images of the color components are overlaid on one another at a predetermined position on the intermediate transfer member 14. The toner images of the color components overlaid on one another on the intermediate transfer member 14 are transferred collectively onto a recording sheet P. Thus, an image is formed on the recording sheet P.

In the fourth example, the image forming units 13 for the four colors, CMYK, are identical in structure; accordingly, one of the image forming units 13 is described below. The image forming unit 13 includes a photosensitive drum 15, a charging unit 16 that electrostatically charges the surface of the photosensitive drum 15 to a desired electric potential, a laser optical unit 17 that performs writing according to the output image data 6 (image data having undergone pseudo-halftoning to be described later) on the photosensitive drum 15 electrostatically charged to the desired potential, a developing unit 18 that develops the electrostatic latent image formed on the photosensitive drum 15 by the writing by the laser optical unit 17 with toner of the corresponding color components, a transfer unit (primary transfer unit) 19 that transfers the toner image on the photosensitive drum 15 developed by the developing unit 18 onto the intermediate transfer member 14, and a cleaner 20 that cleans residual toner on the photosensitive drum 15 that has not been transferred onto the intermediate transfer member 14.

The recording sheet P such as paper is conveyed by a conveying unit from a recording sheet bank (not shown) to registration rollers 21, from which the recording sheet P is conveyed at predetermined timing to a secondary transfer unit 22. The secondary transfer unit 22 transfers the toner images (the four color toner images) on the intermediate transfer member 14 to a desired position on the recording sheet P. The recording sheet P, onto which the toner images have been transferred, receives heat and pressure in a fixing unit 23 and delivered out of the apparatus. By performing the operations in the sequence discussed above, a full-color image according to image data is formed on the recording sheet P, such as paper.

Operations of a semiconductor laser that is operated according to the output image data 6 generated by an image processing apparatus 40 (which is the same as the image processing apparatus of the first example) are briefly described below. A video-signal processing unit 24 receives the output image data 6 (data obtained as a result of the image processing) from the image processing apparatus 40, stores a portion of data corresponding to the number of light-emitting points (laser diodes (LDs)), on a line memory, and passes the data corresponding to each pixel and stored in the line memory to a pulse width modulation (PWM) control unit at a predetermined timing (pixel clock) according to a signal (what is called a synchronization signal) synchronized with rotation of a polygon mirror. In the first example, the number of the light-emitting points is one for each of the four colors. The PWM control unit converts the data into PWM signals and transmits the PWM signals to an LD driver. The LD driver drives each of LD devices (LD array) to cause the LD device to emit light, with predetermined light intensity, modulated with the PWM signals. In the first example, optical modulation of laser light is performed by performing PWM control according to output image data for each of the color components.

The light emitted from the light-emitting points, or the LDs, are collimated through a collimating lens and shaped through an aperture into a light beam having a desired beam size. The light beam out of the aperture passes through a cylindrical lens and enters the polygon mirror. The light beam reflected off the polygon mirror is condensed through a scanning lens (fθ lens) and then reflected off a reflecting mirror to focus onto a position on the photosensitive drum 15.

In the fourth example, the light-emitting points, or the LDs, perform optical writing at a resolution of 600 dpi. It is constructed such that the PWM signals have the degree of freedom of 6 bits. Note that in the image processing apparatus discussed above, the output image data 6 is converted into 4-bit data of 600 dpi resolution by quantization in the pseudo-halftoning. Accordingly, light emission from the light-emitting points, or the LDs, is controlled by associating 4 bits out of the 6 bits of the PWM signals with the output image data 6 (pseudo-halftoned data). Thus, the light-emitting points, or the LDs can emit light in a manner to correspond to the 4 bits (16 patterns including an unlighted state) according to the output image data 6.

The optically-modulated laser beam is caused to focus on the photosensitive drum 15 and perform scanning by the writing device as discussed above. As a result, an electrostatic latent image is formed on the photosensitive drum 15 according to a desired image. Processes for developing this electrostatic latent image into a toner image and transferring the toner image onto the recording sheet P are the same as those discussed above. By performing the operations in the sequence discussed above, a full-color image is formed on the recording sheet P according to the image data.

Fifth Example

An image forming system according to the fifth example of the present invention is identical with the image forming system according to the fourth example in many portions. The fifth example differs from the fourth example in including a reading apparatus for reading the toner image formed on a recording medium to obtain toner-image information data and determining gradation characteristics necessary for each of image segments based on the toner-image information data.

Figures 9, 10:
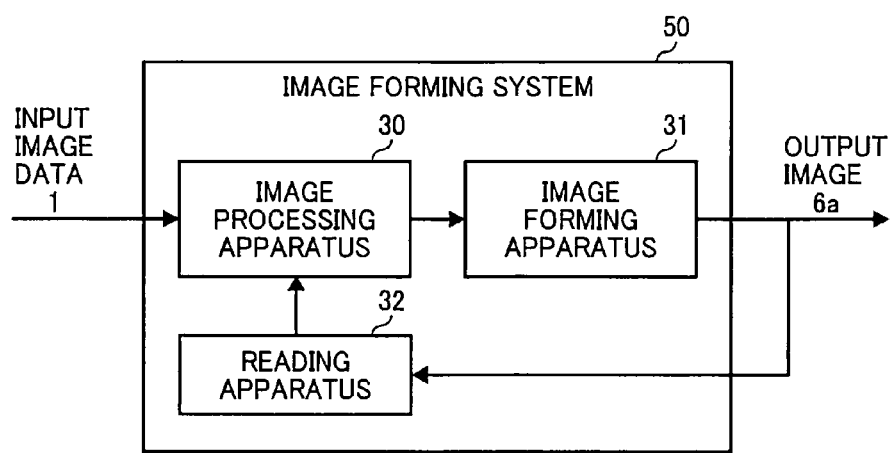
FIG. 9 is a diagram illustrating an image processing system according to a fifth example.
FIG. 10 is a conceptual diagram of segmentation performed by a pseudo-halftoning device according to a sixth example.

FIG. 9 is a schematic diagram of an image forming system 50 according to the fifth example. A flow of data output from an image processing apparatus 30 as an output image 6a through an image forming apparatus 31, which is indicated by thin lines in FIG. 9, is a flow for regular image output. Put another way, this flow illustrates processes, in which the image forming system receives an input of the input image data 1 and forms a desired image on the recording medium as an output. On the other hand, a flow of the output image 6a returning to a reading apparatus 32, which is indicated by thick lines in FIG. 9, corresponds to a feature of the fifth example.

In other words, in the fifth example of the present invention, the configuration is such that a predetermined image for use in determining gradation characteristics can be output; after the image has been read by the reading apparatus illustrated in FIG. 9, the gradation characteristics G1 to G25 to be reflected in dither matrices, each corresponding to one of image segments, are determined; and the gradation characteristics G1 to G25 are fed back to the image processing apparatus.

In the fifth example, the full-color image forming apparatus forms a toner image, in which a gradation pattern of 32 gray levels is formed on each of all the image segments A1 to A25 mentioned above in the discussion about the first example, and outputs the toner image. The reading apparatus includes a colorimeter and measures colors of this toner image with the gradation patterns by using the colorimeter. The gradation characteristics G1 to G25 to be incorporated in the dither matrices to attain intended gradation characteristics are determined based on a result of the color measuring.

In the present example, the gradation characteristics G1 to G25 to be incorporated in the dither matrices are determined for each of the image segments A1 to A25 based on the result of color measuring performed on the gradation patterns of 32 gray levels. At this time, the result of the color measuring performed on the gradation patterns of 32 gray levels is interpolated by using a cubic spline interpolation to thereby obtain relationships between all the values of gray levels of the dither matrices and the color-measured values (i.e., the interpolated values) formed by the image forming apparatus 31. The gradation characteristics (G1 to G25) to be incorporated in the dither matrices are determined based on the relationships between the all values of gray levels and the color-measured values (interpolated values).

Note that the configuration for determining the gradation characteristics G1 to G25 to be incorporated in the dither matrices discussed above is just an example. For instance, a configuration where the colorimeter is located inside the toner-image forming unit and an output image is read online (rather than the output image is manually read) or a configuration where an input unit, such as what is called a scanner or a digital camera, is used instead of the colorimeter can be employed. Any other configuration can be employed so long as gradation characteristics of an output toner image can be obtained. The same holds true for other parts of the configuration, and the gradation patterns of the 32 gray levels and/or the cubic spline interpolation is not necessarily employed in the present invention. Gradation pattern of gray levels other than 32 gray levels and/or other interpolation method can be arbitrarily employed. In short, any configuration, with which the gradation characteristics G1 to G25 to be incorporated in the dither matrices can be obtained, can be employed.

Sixth Example

A pseudo-halftoning device according to the sixth example of the invention is identical with the pseudo-halftoning device according to the first example in many portions. The sixth example differs from the first example in the size (i.e., in the segmenting way) of segments, to which different gradation characteristics are to be applied. More specifically, in the first example, an image is segmented into the segments (A1 to A25), to which different gradation characteristics are to be applied, to be identical in size as illustrated in FIG. 2. In contrast, in the sixth example, an image is segmented into segments, to which different gradation characteristics are to be applied, to include relatively large segments and relatively small segments as illustrated in FIG. 10 rather than into segments (A1 to A25) that are all identical in size.

Seventh Example

Figure 11A:
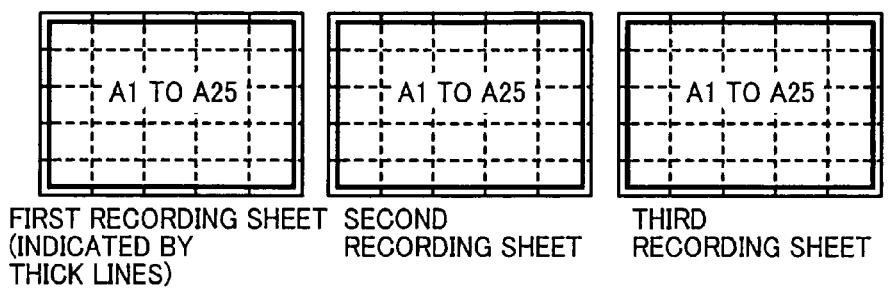
FIG. 11A and FIG. 11B are conceptual diagrams illustrating periodicities of segmentations performed by a pseudo-halftoning device according to a seventh example.
Figure 11B:
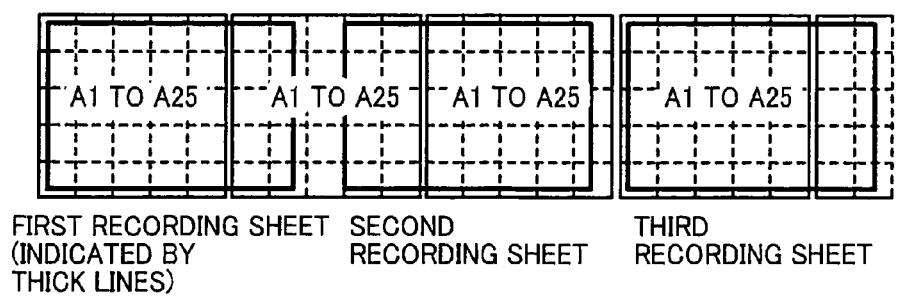

A pseudo-halftoning device according to the seventh example of the invention is identical with the pseudo-halftoning device according to the first example in many portions. The seventh example differs from the first example in that a periodicity of segments, to which different gradation characteristics are to be applied, is equal to a periodicity of an element other than a sheet size. More specifically, in the first example, as illustrated in FIG. 11A, dithering is performed such that the same set of gradation characteristics is applied to the same position on different recording sheets. Put another way, in the first example, the periodicity of segments, to which different gradation characteristics are to be applied, is equal to the sheet size. In contrast, in the seventh example, dithering is performed such that the same set of gradation characteristics is not always applied to the same position on different sheets of recording medium as illustrated in FIG. 11B. Put another way, in the seventh example, the periodicity of segments, to which different gradation characteristics are to be applied, is equal to a periodicity of an element other than the sheet size.

More specifically, in the seventh example, the periodicity of the segments, to which different gradation characteristics are to be applied, is set to be equal to the perimeter (e.g., 31.4 mm) of the photosensitive drum 15. This setting is used in order to reduce color fluctuation caused by decentering of the photosensitive drum 15.

Eighth Example

An image forming system according to the eighth example of the invention is identical with the image forming system according to the fifth example in many portions. The eighth example differs from the fifth example in the number of toner images to be read by the reading apparatus to obtain the toner-image information data. More specifically, in the fifth example, the toner-image information data is obtained by reading a single toner image, whereas in the eighth example, the toner-image information data is obtained by reading three toner images under the same condition with that of the fifth example. In the eighth example, the gradation characteristics to be incorporated in the dither matrices to attain intended gradation characteristics are determined based on average values of the toner-image information data obtained by reading the three toner images. In other words, the eighth example is identical with the fifth example except that average values are calculated from the toner-image information data about the three toner images.

According to the image forming system in the present invention, it becomes easy to realize size reduction, cost reduction, and the like of the apparatus as well as speedup in processing, and furthermore versatility of area coverage modulation can be sufficiently ensured by facilitating a process for changing a screen angle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming system comprising:
a pseudo-halftoning device;
an image forming apparatus that forms a toner image on a recording medium; and
a reading apparatus that read the toner image on the recording medium, wherein
the pseudo-halftoning device is such that
pseudo-halftoning is performed on a target image by using a threshold matrix set including a plurality of threshold matrices,
one threshold matrix for use is selected from the threshold matrix set according to a position of the target image to be used in the pseudo-halftoning performed on the target image,
the threshold matrices in the threshold matrix set are identical with one another in periodic structure but different from one another only in a gradation characteristic, and
a threshold matrix to be used is determined based on toner-image information data obtained by reading the toner image by the reading apparatus.

2. The image forming system according to claim 1, wherein in the pseudo-halftoning device, not all of segments of the target image, to which different gradation characteristics are to be applied, have a same size.

3. The image forming system according to claim 1, wherein in the pseudo-halftoning device, number of segments of the target image, which are segmented according to a gradation characteristic and to which different gradation characteristics are to be applied, is in a range of three to ten in each of a length direction and a width direction when the recording medium is an A3-size recording medium.

4. The image forming system according to claim 1, wherein in the pseudo-halftoning device, a periodicity of segments of the target image, to which different gradation characteristics are to be applied, matches a periodicity other than a size of the recording medium.

5. The image forming system according to claim 1, wherein the reading apparatus obtains the toner-image information data by reading toner images on a plurality of recording media.

6. An image forming system comprising:
a pseudo-halftoning device;
an image forming apparatus that forms a toner image on a recording medium; and
a reading apparatus that reads the toner image on the recording medium, wherein
the pseudo-halftoning device is such that
pseudo-halftoning is performed on a target image by using a threshold matrix set including a plurality of threshold matrices, one threshold matrix for use is selected from the threshold matrix set according to a position of the target image to be used in the pseudo-halftoning performed on the target image, the threshold matrices in the threshold matrix set are generated from a same parent matrix having a higher degree of freedom in number of gray levels, and a gradation characteristic of a threshold matrix generated from the parent matrix is generated based on toner-image information data obtained by reading the toner image by the reading apparatus.

7. The image forming system according to claim 6, wherein in the pseudo-halftoning device, not all of segments of the target image, to which different gradation characteristics are to be applied, have a same size.

8. The image forming system according to claim 6, wherein in the pseudo-halftoning device, number of segments of the target image, which are segmented according to a gradation characteristic and to which different gradation characteristics are to be applied, is in a range of three to ten in each of a length direction and a width direction when the recording medium is an A3-size recording medium.

9. The image forming system according to claim 6, wherein in the pseudo-halftoning device, a periodicity of segments of the target image, to which different gradation characteristics are to be applied, matches a periodicity other than a size of the recording medium.

10. The image forming system according to claim 6, wherein the reading apparatus obtains the toner-image information data by reading toner images on a plurality of recording media.

11. An image forming system comprising:
a pseudo-halftoning device;
an image forming apparatus that forms a toner image on a recording medium; and
a reading apparatus that reads the toner image on the recording medium, wherein
the pseudo-halftoning device is such that
  pseudo-halftoning is performed on a target image by using a threshold matrix,
  a parent matrix having a greater number of gray levels than number of gray levels of the target image is included,
  a threshold-value generating device is included, which generates, from the parent matrix, a threshold value used when performing the pseudo-halftoning on the target image,
  the threshold-value generating device generates a threshold value that varies according to a position of the target image and uses generated threshold value in the pseudo-halftoning performed on the target image, and
  the threshold value generated from the parent matrix is determined based on toner-image information data obtained by reading the toner image by the reading apparatus.

12. The image forming system according to claim 11, wherein in the pseudo-halftoning device, not all of segments of the target image, to which different gradation characteristics are to be applied, have a same size.

13. The image forming system according to claim 11, wherein in the pseudo-halftoning device, number of segments of the target image, which are segmented according to a gradation characteristic and to which different gradation characteristics are to be applied, is in a range of three to ten in each of a length direction and a width direction when the recording medium is an A3-size recording medium.

14. The image forming system according to claim 11, wherein in the pseudo-halftoning device, a periodicity of segments of the target image, to which different gradation characteristics are to be applied, matches a periodicity other than a size of the recording medium.

15. The image forming system according to claim 11, wherein the reading apparatus obtains the toner-image information data by reading toner images on a plurality of recording media.

16. An image forming apparatus comprising:
a pseudo-halftoning unit;
an image forming unit that forms a toner image on a recording medium; and
a reading unit that read the toner image on the recording medium, wherein the pseudo-halftoning unit is such that
  pseudo-halftoning is performed on a target image by using a threshold matrix set including a plurality of threshold matrices,
  one threshold matrix for use is selected from the threshold matrix set according to a position of the target image to be used in the pseudo-halftoning performed on the target image,
  the threshold matrices in the threshold matrix set are identical with one another in periodic structure but different from one another only in a gradation characteristic, and
  a threshold matrix to be used is determined based on toner-image information data obtained by reading the toner image by the reading unit.

* * * * *